Patented May 1, 1945

2,375,165

UNITED STATES PATENT OFFICE 2,375,165

RECOVERY OF NITROGENOUS PRODUCTS FROM ORGANIC WASTES

Alpheus R. Nees and Arthur N. Bennett, Denver, Colo., assignors to The Great Western Sugar Company, Denver, Colo., a corporation of New Jersey No Drawing. Application June 27, 1942, Serial No. 448,858

10 Claims. (Cl. 260—534)

This invention relates to the recovery of valuable organic nitrogenous substances from impure solutions or wastes containing the same together with other organic and inorganic constituents.

Large volumes of such solutions occur as by-products of various food manufacturing processes but are discarded or wasted for lack of economical methods to recover their valuable constituents. For example, the Steffen and barium processes for desugarizing sugar beet molasses yield end products, known as "waste water," which are dilute solutions of complex composition containing inorganic compounds (ash) such as sodium, potassium and calcium salts, sugar and other non-nitrogenous organic compounds, and substantial concentrations of valuable organic nitrogen compounds, such as betaine, and various amino acids derived from proteins, including glutamic acid, tyrosine, leucine, glycine and similar substances. Although methods have been proposed for recovering some of these compounds, the known methods require costly concentrations, chemical treatments and selective crystallizations and so have been too expensive for general industrial use. Practically all of the waste water produced in beet sugar manufacture therefore is discarded into streams, which not only entails an economic waste but also is a bad source of stream pollution.

Steffen waste water, for example, is a dilute liquid containing about 1.5 to 3% of dry matter composed of about 40 to 45% ash (calculated as sodium and potassium sulfates), about 15 to 18% betaine, about 3 to 6% glutamic acid, and the balance other nitrogenous and non-nitrogenous organic compounds. Betaine is a basic nitrogenous substance of well-known utility which is present in the waste water as tri-methyl glycocol ($C_5H_{11}O_2N.H_2O$). Glutamic acid is another nitrogenous compound—a degradation product of protein—the sodium salt of which, mono-sodium glutamate, has a meaty flavor and is used in the preparation of condiments such as soy sauce, for flavoring purposes, etc.

It is a principal object of this invention to provide a new and economical process for the recovery of valuable organic nitrogenous substances from impure or waste solutions of organic matter which contain such substances together with inorganic compounds.

Another object of this invention is to provide a new and improved process for preparing comparatively pure and more concentrated solutions of organic nitrogen compounds from impure dilute solutions thereof.

Another object of the invention is to provide a new and improved process for the production of betaine from sugar beet wastes, such as Steffen process or barium process waste water. Another object is to recover glutamic acid from such wastes.

Another object is to provide a process for the production of both betaine and glutamic acid from sugar beet wastes.

A further object of this invention is to enable the reduction or elimination of sources of stream pollution by making it economical to process sugar beet waste waters and other organic waste solutions for the recovery of nitrogenous compounds therefrom, rather than to discard such solutions into streams.

This invention utilizes certain newly discovered properties of ion exchange materials, particularly the carbonaceous or resinous zeolites known as cation or hydrogen exchange materials, which have the known property of adsorbing basic ions from solutions and replacing them by hydrogen ions. Such hydrogen exchange materials have been used heretofore for the removal of basic or metallic ions from solutions, such as in the purification of water. For example, when water is passed through a bed of such material, the basic ions in the water, such as sodium, potassium, calcium, etc., are adsorbed by the material and replaced by an equivalent quantity of hydrogen ions, and the water passes out of the bed as a purified acidic effluent containing the anions with which the basic ions were originally combined. When the exchanger bed becomes saturated with basic ions it is regenerated and made ready for re-use by treating it with a strong acid, such as sulphuric acid, which combines with and removes the adsorbed basic ions, replacing them by hydrogen ions. Further information concerning such ion exchange materials appears in an article of Robert J. Meyers et al., published in Industrial and Engineering Chemistry, vol. 33, pages 697–706 (1941). Suitable examples of such materials, for use as described hereinbelow, are the substances sold under the trade names "Nalcite A" (by National Aluminate Corporation), "Catex" (by The International Filters Corporation), "Zeo-Karb" (by the Permutit Company), and "Amberlite IR–1" (by Resinous Products and Chemical Co., Inc.).

We have discovered that a peculiar selective adsorption of organic nitrogen compounds takes place when an impure solution of organic and inorganic matter containing such compounds is passed through a bed or column of active hydrogen exchange material, which adsorption is accompanied by an adsorption of cations from the solution and an equivalent exchange of hydrogen ions to the solution; and as the exchange material becomes saturated with cations a preference is shown for the cation adsorption and the adsorbed nitrogen compounds are then displaced and returned, or released, to the passing solution. In effect, the layer or zone of exchange material first contacted by the solution adsorbs nitrogen compounds and cations, and as the feeding of solution continues and this first material becomes saturated with cations the adsorbed nitrogen compounds are released and then readsorbed by unsaturated exchange material in the next zone or layer of the bed. This in turn releases the nitrogen compounds when it becomes saturated with cations. Solution of high acidity and of low cation and nitrogen content meanwhile passes onward through the bed.

This action occurs progressively from the inlet to the outlet of the bed during the process of exhausting or saturating the whole bed. There exists, therefore, a zone of high nitrogen concentration which moves slowly from the inlet to the outlet of the exchanger, being in effect displaced and pushed forward by the saturation of the exchange material with the cations, and when the saturation is complete adsorbable nitrogen compounds have been removed by the bed from a first portion of the effluent and have then been returned in greater concentration to a later portion thereof passing from the bed.

The effluent emerging in the course of saturation thus is composed of several distinct and successive, though not sharply defined, portions or zones: Starting with a fresh watered bed, water is first displaced by the feed solution. Next comes acidic solution containing substantially no organic nitrogen compounds or inorganic salts but containing the acids released in the solution by the adsorption of cations. This acid solution is followed by solution quite rich in organic nitrogen compounds from which most of the ash has been removed, and after that the effluent becomes higher in ash content and only partially enriched in nitrogen compounds. Finally, its composition approximates that of the feed solution, which signifies that the bed is completely saturated with cations. By observing their changing qualities, therefore, the different portions of the effluent may be separated from each other, and an enriched fraction may be recovered having a high concentration of nitrogen compounds and a low concentration of inorganic salts as compared with the original solution.

Accordingly, pursuant to the above-described discoveries, we produce purified and more concentrated solutions of adsorbable organic nitrogen compounds by passing impure dilute solutions containing the same and other organic and inorganic constituents through a bed of hydrogen exchange material and then dividing from the effluent a fraction or portion thereof which is materially enriched in nitrogen compounds. In practice, the desired division or separation into fractions may be effected readily by control based upon the volume or the pH, or both, of the outflowing solution. The nitrogen-enriched solution so obtained may be utilized as such in some cases, but it generally will be treated further to concentrate or isolate particular desired nitrogeneous compounds, according to their nature.

The invention manifestly has a wide field of applications, for the recovery of organic nitrogen compounds from various impure solutions of the type described, of either vegetable or animal origin. According to some of its embodiments, betaine or glutamic acid, or both, or tyrosine or other similar nitrogen compounds, may be recovered from sugar beet waste waters at an efficiency and economy far superior to any process heretofore known. Another application of the invention is for the treatment of solutions produced from the fermentation of soy beans, which contain adsorbable nitrogen compounds well worth isolating or recovering in a more concentrated form. The adsorbable nitrogen compounds recoverable pursuant hereto may be designated generally as "amino acid compounds," by which we mean amino acids as well as completely methylated amino acids such as betaine.

According to an important embodiment of the invention, a process for the recovery of betaine and glutamic acid from sugar beet waste water is provided substantially as follows: Dilute waste water preferably is first treated with carbon dioxide gas, and then filtered, to remove excess lime (remaining from processes of sugar manufacture) as calcium carbonate. This is not essential but is more economical than to remove lime by the hydrogen exchange treatment. The dilute waste water is then passed directly through one or more columns or beds of hydrogen exchange material, which acts as hereinabove described, and the resulting effluent is observed and divided into fractions so as to obtain a fraction which is enriched in organic nitrogen compounds but of low ash content. Most of the betaine and glutamic acid present in the original solution may be concentrated in this fraction, and the remainder may be recovered in a separate, partially enriched fraction for passage through another exchanger bed.

If desired, the enriched fraction so obtained may then be treated for the removal of coloring matter and colloidal substances therefrom, such as by passing it over a bed of granular activated carbon, or otherwise treating it with activated carbon. It is then concentrated by evaporation until its content of dry matter exceeds, say, 50%, whereupon the concentrated solution is cooled and allowed to crystallize. If the pH of the solution at this stage approximates the iso-electric point, or minimum solubility point, of glutamic acid, which is usually found to be the case, glutamic acid crystallizes in due course and may then be isolated. If necessary, the pH reaction of the concentrated solution may be adjusted before crystallization to approximately the iso-electric point of glutamic acid, which is about pH 3.2.

Upon the removal of glutamic acid crystals, a mother liquor is obtained which is then treated for the recovery of betaine. First, an acid which forms an acid salt with betaine, preferably hydrochloric acid, is added in a quantity theoretically sufficient to form betaine hydrochloride with the betaine content. Sulfuric or phosphoric acid may be used. The acid salt of betaine is then caused to crystallize by evaporating the liquid under reduced pressure, such as in a vacuum pan, and the resulting crystals are filtered off or otherwise separated. One or more additional crops of such crystals may then be obtained by successive boilings of the remaining mother liquor. The solution obtained from the final betaine separation will contain other organic nitrogen compounds present in the original waste water, which may be recovered by further appropriate treatments, if desired.

The following description sets forth an example of the invention as applied for the recovery of betaine and glutamic acid from so-called hot Steffen waste water. Hot waste water is the impure solution usually discarded from beet sugar factories as a waste product. It contains about 0.05 to 0.20% of sugar, and it differs from so-called cold waste water, which contains about 0.3 to 0.5% of sugar, in having been heated to about 80 to 85° C. to effect a further precipitation and removal of sugar as calcium sucrate.

The waste water is first treated with carbon dioxide gas to precipitate the excess lime as calcium carbonate which is removed by filtration. It is then passed directly through an ion exchanger column containing a fresh watered bed of hydrogen exchange material, such as "Amberlite IR-1." Its temperature at this stage is not critical but may be as high as the exchange material will withstand, say 80° to 90° C., although ordinary room temperatures, such as 25° to 30° C., are preferred. A bed containing about 35 cubic feet of the exchange material may be used to treat about 1000 gallons of waste water containing 2 to 3% or about 240 pounds of dry matter, of which approximately 35 pounds may be betaine and 10 pounds glutamic acid. The depth of the bed influences the degree of concentration of nitrogenous compounds effected thereby, and in the example is about 9 to 12 feet.

As the waste water passes into and through the exchanger an effluent is taken off from the bottom and is divided into four portions or fractions, substantially as follows: The first portion amounts to about 120 gallons of displaced water, equivalent to about one-half the volume of the exchanger bed. As this portion passes off, the pH of the effluent drops very rapidly to about pH 1.0, and the second portion is then taken off separately and continued until its pH has gradually increased to about 1.5, at which point the nitrogen compounds have begun to appear. This second fraction, containing released acids and substantially no nitrogen or ash, may amount to about 450 gallons. The recovery of a third fraction, which is the fraction strongly enriched in nitrogen compounds, is begun with the discontinuation of the second fraction and is continued until the pH of the effluent increases to about 4.0. At this point the ash content increases to an undesirable extent, whereupon a fourth fraction somewhat enriched in nitrogen compounds is collected and sent to a freshly regenerated exchanger bed for re-treatment. This fourth fraction is continued until the ash content of the effluent is substantially the same as that of the feed solution, which occurs at about pH 6.0 to 6.5, when the exchanger bed has become fully saturated with cations.

Under the assumed conditions the nitrogen-enriched fraction will amount to about 250 gallons, containing about 50 to 60% of the nitrogen compounds of the feed solution at two or more times their original concentration. The fourth fraction amounts to about 300 gallons and contains the balance of the nitrogen compounds at a slightly increased concentration but still contaminated with ash. All volumes and proportions, of course, are variable and will be different if an equilibrium condition is established by flowing feed solution and the partially enriched fractions of several effluents through a series of exchanger beds.

When the exchanger bed has become saturated, the flow of waste water thereinto is discontinued and the solution remaining in the bed is displaced by water. The bed is then washed and regenerated with acid, usually sulfuric acid. A part of the acid requirement, about 30 to 40% thereof, may be supplied by using the second fraction above-mentioned for regeneration, which is an important feature adding greatly to the economy of the process. After regeneration the bed is washed to remove acid and is again ready for use. The first fraction separated from the effluent may be saved and used for such washing operations or to prepare acid for regeneration. Consequently, the net results of the ion exchange treatment are the production of a purified concentrated solution of organic nitrogen compounds from a dilute impure solution, at the expense of some 60 to 70% of the amount of acid required for regeneration of the exchange material, plus a certain amount of water.

The nitrogen-enriched fraction contains betaine and glutamic acid at a concentration 2 to 3 times greater than the original waste water, with only about 10% as much ash as the original waste. This liquid is passed over a bed of granular activated carbon, such as the product known as "Darco" or "Super-Norit," to remove color and colloidal matter, and it is then evaporated to about 65% dry matter. The concentrated solution, at approximately pH 3.2, is then allowed to stand for two or three days, until the glutamic acid has crystallized. If necessary, the pH reaction is adjusted to about 3.2 for this purpose. After this crystallization glutamic acid crystals are filtered off, and the mother liquor so obtained is then treated with that quantity of hydrochloric acid necessary to form betaine hydrochloride with the betaine content of the solution. Upon concentration of the acid-treated solution in a vacuum pan, betaine hydrochloride crystallizes and is then separated by filtration or centrifuging. The mother liquor recovered from this separation is then reboiled in a vacuum pan to effect a further crystallization and recovery of betaine hydrochloride.

The process of treating waste water as above described has several distinct advantages over any known process. For example: (1) The yield of betaine is about 20% greater. (2) Both glutamic acid and betaine hydrochloride are recovered by the same process, and also other organic nitrogen compounds if desired. (3) Of major import, the process is far less expensive than any other process. This results primarily from reducing the amount of evaporation to about half of that which would be required to concentrate the total waste water, the cost of evaporation being the principal expense in treating such dilute waste solutions. In addition, however, a more complete separation of ash from nitrogenous compounds is obtained at a substantially lower cost than has been possible heretofore.

The above-described embodiment of the invention may be modified for the recovery of glutamic acid alone by dispensing with the betaine crystallizations, or for the recovery of betaine alone by adding acid to the enriched fraction after the activated carbon treatment and proceeding directly to the crystallization of the corresponding acid salt of betaine.

The invention disclosed herein has some features common to the disclosure of a co-pending application, Serial No. 431,276, filed February 17, 1942, of Arthur N. Bennett, which involves the treatment of a betaine-containing solution prepared from waste water in a bed of hydrogen exchange material and the separation of a betaine-enriched fraction from the effluent, to be treated further for the recovery of betaine or an acid salt of betaine. According to the practice described in that application, however, the waste water is first concentrated by evaporation and then is extracted with alcohol to obtain an alcoholic extract of high betaine and low ash concentration. Alcohol is then distilled from the extract, and the residue is re-dissolved in water to form a solution for the ion exchanger treatment, which is utilized to obtain an effluent fraction further enriched in betaine. According to the present invention, on the other hand, waste water or any similar impure nitrogen-containing organic liquid may be passed through the exchanger bed in its original dilute condition and without preliminary purification (except the lime salt removal, or the like, when desired). The exchanger yields a concentrated effluent fraction which is enriched not only in betaine but also in the other adsorbable nitrogen compounds contained in the feed solution. Moreover, in the course of the same treatment the exchanger yields from the impure feed a large volume of another effluent fraction which is quite acid and which may be utilized for regenerating the exchange material. This invention therefore has a wide field of applications and may be used for the recovery of various adsorbable organic nitrogen compounds; and it is quite economical because a great deal of costly evaporation is eliminated and because acid costs in practice are materially reduced.

It will be understood that our invention may be practiced in various other ways, and for the concentration or isolation of various adsorbable organic nitrogen compounds from various impure solutions of organic origin. We therefore desire that the invention be accorded a scope commensurate with its contributions to the art, as disclosed hereinabove and set forth particularly in the appended claims.

We claim:

1. A process for preparing a more concentrated solution of amino acid compounds from an impure dilute solution derived from the processing of protein-containing organic matter and containing such compounds with ionized inorganic constituents, which comprises passing the dilute solution through a bed of granular organic hydrogen exchange material substantially saturated with hydrogen ions and dividing from the resulting effluent a portion thereof which is substantially enriched in such amino acid compounds.

2. A process for preparing a purer and more concentrated solution of amino acid compounds from an impure dilute solution derived from the processing of protein-containing organic matter and containing such compounds with other organic and ionized inorganic constituents, which comprises passing the dilute solution through a bed of granular organic hydrogen exchange material substantially saturated with hydrogen ions and dividing successive portions of the resulting effluent into several fractions including an acidic fraction of low nitrogen and ash content, a fraction of low ash content that is substantially enriched in nitrogen compounds and a fraction somewhat enriched in nitrogen compounds and somewhat reduced in ash content as compared with the dilute solution.

3. A process for preparing a purer and more concentrated solution of amino acid compounds from an impure dilute solution derived from the processing of protein-containing organic matter and containing such compounds with other organic and ionized inorganic constituents, which comprises feeding the dilute solution into and through a freshly regenerated bed of granular organic hydrogen exchange material substantially saturated with hydrogen ions while taking off a resulting effluent from the outlet of the bed, dividing the effluent into several successive fractions according to its changing composition, including an acidic fraction of low nitrogen and ash content, a fraction of low ash content that is substantially enriched in nitrogen compounds and a fraction somewhat enriched in nitrogen compounds and somewhat reduced in ash content as compared with the dilute solution, discontinuing the feeding when the effluent becomes nearly the same as the feed solution, and thereafter treating the exchange material with an acid solution, including said acidic fraction, to regenerate the bed.

4. A process for preparing an enriched solution of amino acid compounds from sugar beet waste water, which comprises treating the waste water with carbon dioxide to precipitate excess lime as calcium carbonate, separating the calcium carbonate, and then passing the waste water in its original dilute condition through a bed of granular organic hydrogen exchange material substantially saturated with hydrogen ions and dividing from the resulting effluent a portion thereof which is substantially enriched in such amino acid compounds.

5. A process for recovering betaine from sugar beet waste water which comprises passing the waste water through a bed of granular organic hydrogen exchange material substantially saturated with hydrogen ions, dividing from the resulting effluent a portion thereof which is substantially enriched in amino-acid compounds, treating said portion with activated carbon to clarify the same, thereafter reacting said portion with enough of a mineral acid that forms an acid salt with betaine to form a solution containing the betaine content of said portion as the corresponding acid salt of betaine, and then crystallizing and separating said salt from said solution.

6. A process for recovering glutamic acid from sugar beet waste water, which comprises passing the waste water through a bed of granular organic hydrogen exchange material substantially saturated with hydrogen ions, dividing from the resulting effluent a portion thereof which is substantially enriched in amino-acid compounds, thereafter concentrating said portion by evaporation to at least 50% dry matter and thereafter crystallizing and separating glutamic acid from the resulting concentrated solution.

7. A process for recovering betaine and glutamic acid from sugar beet waste water, which comprises passing the waste water through a bed of granular organic hydrogen exchange material substantially saturated with hydrogen ions, dividing from the resulting effluent a portion thereof having substantially increased concentrations of amino-acid compounds, thereafter concentrating said portion by evaporation, allowing the concentrated solution to stand to crystallize glutamic acid therefrom, separating the glutamic acid crystals, adding a mineral acid that forms an acid salt with betaine to the separated mother liquor in an amount sufficient to form an acid salt of betaine with the betaine content thereof, boiling the resulting solution in a vacuum pan to crystallize said acid salt and then separating said salt.

8. A process for recovering amino acid compounds from sugar beet waste water, which comprises carbonating the waste water and separating excess lime therefrom as calcium carbonate, passing the resulting waste water in dilute condition through a bed of granular organic hydrogen exchange material substantially saturated with hydrogen ions, dividing the resulting effluent into several separate fractions including an acidic fraction of low nitrogen and ash content, a fraction of low ash content that is substantially enriched in such amino acid compounds and a fraction somewhat enriched in such compounds and somewhat reduced in ash content as compared with the dilute waste, evaporating said enriched fraction to form a concentrated solution, crystallizing and separating glutamic acid from such concentrated solution, adding hydrochloric acid to the remaining mother liquor in an amount sufficient to form betaine hydrochloride with the betaine content thereof, and crystallizing and separating betaine hydrochloride from the resulting solution.

9. A process as described in claim 8 wherein the flow of waste water through the bed is discontinued when the composition of the effluent approximates that of the waste water, whereupon the bed is washed and then regenerated by treating the same with acid, including the aforesaid acidic fraction.

10. A process as described in claim 8 wherein the said division of the effluent into fractions is controlled by the changing pH condition of the effluent, the said acidic fraction being taken off until the pH of the effluent has increased to about 1.5, the said enriched fraction being then taken off until the pH of the effluent has increased to about 4.0, and the said somewhat enriched fraction being taken off until the pH of the effluent has increased to about 6.0 to 6.5.

ALPHEUS R. NEES.
ARTHUR N. BENNETT.